United States Patent
Matsumoto et al.

(10) Patent No.: US 6,389,942 B1
(45) Date of Patent: *May 21, 2002

(54) WIRE CUTTER OF WIRE-CUT ELECTRICAL DISCHARGE MACHINE

(75) Inventors: Hiroshi Matsumoto; Sadao Sano, both of Kanagawa (JP)

(73) Assignees: Sodick Co., Ltd.; KHS Co., Ltd., both of Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/147,313
(22) PCT Filed: Mar. 31, 1998
(86) PCT No.: PCT/JP98/01497
§ 371 Date: Nov. 25, 1998
§ 102(e) Date: Nov. 25, 1998
(87) PCT Pub. No.: WO98/43771
PCT Pub. Date: Oct. 8, 1998

(30) Foreign Application Priority Data

Mar. 31, 1997 (JP) ............................................ 9-94425

(51) Int. Cl.[7] ................................................ B26D 7/14
(52) U.S. Cl. ............................ 83/200.1; 83/950; 83/175
(58) Field of Search ............................... 83/950, 200.1, 83/175; 225/100; 72/186, 196; 241/236

(56) References Cited

U.S. PATENT DOCUMENTS

| | | | | |
|---|---|---|---|---|
| 2,454,241 A | * | 11/1948 | Wennerberg | ................. 83/950 |
| 3,628,409 A | * | 12/1971 | Imbert | ......................... 83/175 |
| 4,242,558 A | | 12/1980 | Kunze | |
| 4,751,364 A | | 6/1988 | Tobler et al. | |
| 5,047,607 A | | 9/1991 | Briffod | |
| 5,357,072 A | * | 10/1994 | Garwick | ................. 219/69.12 |
| 5,454,523 A | | 10/1995 | Matsuda | |

FOREIGN PATENT DOCUMENTS

| | | |
|---|---|---|
| DE | 41 20 739 | 12/1992 |
| JP | 56-82131 | 7/1981 |
| JP | 61-53170 | 11/1986 |
| JP | 1-92029 | 4/1989 |

* cited by examiner

Primary Examiner—M. Rachuba
Assistant Examiner—Kim Ngoc Tran
(74) Attorney, Agent, or Firm—McDermott, Will & Emery; Paul Devinsky (57) ABSTRACT

A wire cutting device (3) for cutting a wire electrode (5), used to generate an electric discharge between it and a workpiece (W), comprising a drive gear (12), a follower gear (13) which meshes with the drive gear and is shiftable in its axial direction relative to the drive gear, an adjustable bias mechanism (17) which presses the follower gear against the drive gear in order to accommodate wire electrode of various diameters, materials and conditions, take-up rollers (10a, 10b) which feed spent wire electrode between the drive gear and the follower gear, and a drive mechanism for driving the drive gear such that the peripheral speed of the drive gear is greater than the speed at which the wire electrode is fed out by the wire take up device. The wire electrode, pinched between the drive gear and the follower gear, is held in place between two adjacent teeth (13d, 13e) of either the drive gear or the follower gear, and the portion of the wire electrode which is held in place is pressed by the teeth (12e) of one gear into the teeth of the other gear, and is broken by means of tensile force. The pressing force of the biasing mechanism is adjustable by means of an adjustment screw (17e).

9 Claims, 7 Drawing Sheets

WIRE CUTTER OF WIRE-CUT ELECTRICAL DISCHARGE MACHINE

FIELD OF THE INVENTION

The present invention relates to a wire cut electric discharge machine which machines a workpiece by generating an electrical discharge between a travelling wire electrode and the workpiece. In particular, the present invention relates to a wire cutting device which in the wire electrode used to generate an electrical discharge is cut into small pieces.

BACKGROUND OF THE INVENTION

Wire cut electric discharge machines in which the wire electrode (referred to below as "wire") is conveyed from a wire supply bobbin through a tensioning device and/or multiple pulleys to a wire uptake roller or a wire pull-in roller are known. In such machines, the workpiece is machined by causing an electrical discharge in the space or "gap" formed between the wire, which is moving under a specified tension, and the conductive workpiece. Copper or brass wire having a diameter of 0.1 mm to 0.3 mm is generally used for the wire electrode. When necessary; molybdenum or tungsten wire, both of which have a high tensile strength, may be used when a diameter under 0.1 mm is desired. A wire pull-in roller pulls the wire used to generate an electrical discharge, and the spent wire is fed out to an appropriate wire collection container, such as a bucket. Such a wire cut electric discharge machines has a high machining accuracy and are appropriate for precision machining.

In recent years, in order to operate wire cut electric discharge machines automatically over many hours, large wire supply bobbins, such as 10 Kg rolls or 50 Kg rolls, have come into use. At the same time, the necessity has arisen for large wire collection containers capable of holding large amounts of spent wire. Japanese Utility Model 2-15825 and Japanese Patent 61-53170 disclose wire cutting devices which are placed between the wire take-up roller and the wire collection container, and which cut the used wire into small pieces. By means of such a wire cutting device, it is possible to hold a large volume of wire without resort to an excessively large capacity wire collection container.

The wire cutting device disclosed in Patent 61-53170 consists of a gear-shaped cutter on which cutting blades which cut the wire are equally spaced around the perimeter, and a roller on which protuberances used to tension the wire for cutting are provided around the perimeter at the same spacing as the cutting blades. The gear-shaped cutter and roller are placed so as to maintain a spacing determined by the wire diameter. Furthermore, the drive mechanism which rotates the gear-shaped cutter and roller in consonance with the wire feed direction is mounted on the wire cutting device. Used wire is fed between the gear-shaped cutter and the roller, and is sheared by the wear-free blade edge of the gear-shaped cutter blade, while being held in place in the gap between the cutting blade and the roller protuberances. The cutting characteristics of this device are greatly affected by the shape of the cutting blade edge. For example, blade edge wear can cause rounding, and wear characteristics of the wire caused by electrical discharge can change, leading to cutting defects. This leads to problems such as the need to frequently change the gear-shaped cutter, or to frequently precision-adjust the relative positions of the gear-shaped cutter and the roller.

SUMMARY OF THE INVENTION

An object of the present invention is to provide a wire cutting device for a wire cut electric discharge machine for which fine adjustments of the gear are unnecessary, even if there are changes in wire diameter, material, or wire wear condition.

A further object of the present invention is to provide a wire cutting device for a wire cut electric discharge machine which does not require fine adjustment of the gear even if the shape of the gear protuberances change due to wear so that the, cutting performance will not degrade even over extended time periods.

Other objects of the present invention are described in the explanation which follows, and will in part become apparent to practitioners of the art through implementation of the invention.

In order to achieve the above objectives, the wire cutting device for cutting a wire electrode used to generate an electrical discharge between a wire electrode and a workpiece comprises:

a drive gear;

a follower gear which engages the drive gear and which is freely profile shiftable relative to the drive gear;

a bias mechanism for pressing the follower gear against the drive gear;

a wire fake-up for feeding the spent wire electrode between the drive gear and the follower gear; and a drive mechanism which drives the drive gear such that the perimeter speed of the drive gear is greater than the speed at which the wire electrode is fed out by the wire outfeed device.

As the drive gear and follower gear rotate, the wire electrode sandwiched between the gears is held in place between two adjacent teeth of one of either the drive gear or the follower gear; the portion of the wire electrode held in place is pressed into one of the gears by the teeth of the other gear, and is cut by tensile force.

Preferably, the wire cutting device will include a wire position adjustment device which, in order to change the contact position of the wire electrode and the gears, will either more of the gear or the wire electrode relative to the other in the direction of the gear rotational axis.

Further, the pressing force of the pressing force imparting mechanism is preferably adjustable.

BRIEF DESCRIPTION OF FIGURES

FIG. 10($a$) is a side view of an enlargement of a portion of a tooth edge of the gear of FIG. 2.

PREFERRED EMBODIMENT OF THE INVENTION

Figure 1:
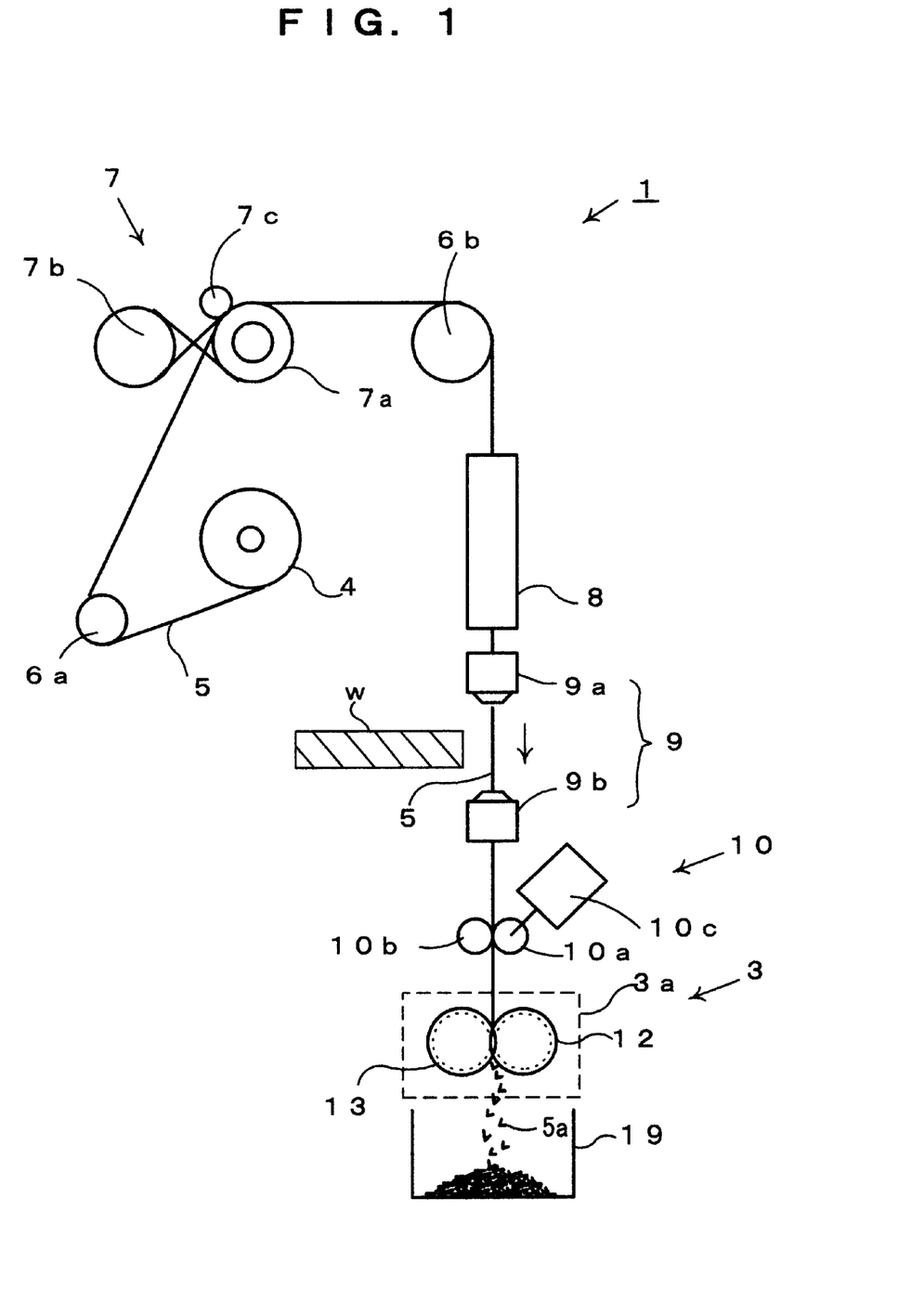
FIG. 1 is an illustration of a wire cut electric discharge machine having a wire cutting device according to the present invention is applied.

A wire cut electric discharge machine using the wire cutting device of the present invention is explained below with reference to FIG. 1.

The wire 5 in the wire cut electric discharge machine 1 is transported from a wire supply bobbin 4 through a pulley 6a, a tensioning device 7 which imparts an appropriate tension to the wire 5, a pulley 6b and an automatic wire threader 8 to a pair of wire guides 9a, 9b. The tensioning device 7 includes a pair of pulleys 7a, 7b bridged in a cross-tie by the wire 5, and a pinch roller 7c which contacts pulley 7a. A pair of wire guides 9a, 9b guide the travel of the wire 5 and determine the position of the wire 5 relative to the workpiece W placed between the wire guides 9a, 9b. In order to generate a discharge in the space formed between the wire 5 and the workpiece W—the "gap"—a machining pulse voltage is supplied across the gap from a power supply (not shown). Either the wire 5 running between the pair of wire guides 9a, 9b, or the workpiece W may be moved relative to the other within a plane which is perpendicular to the wire axis. The wire used to generate an electrical discharge further passes through a lower wire guide 9b and is transported to a wire take-up device 10. The wire take-up device 10 pulls the wire 5 such that it travels along the transport path of the wire 5 at a predetermined speed. The wire take-up device 10 includes a roller 10a, a follower roller 10b which presses against the perimeter surface of the roller 10a, and a drive motor 10c which rotates the roller 10a. The wire pull-in device 10, in addition to its function of tensioning the wire 5, also comprises a part of the wire cutting device 3, which performs the function of feeding the wire 5 in the direction between flat gears 12 and 13. The wire 5 is sandwiched between the flat gears 12 and 13 in the wire cutting device 3, is cut into small pieces 5a, and falls into a collection box 19.

Figure 2:
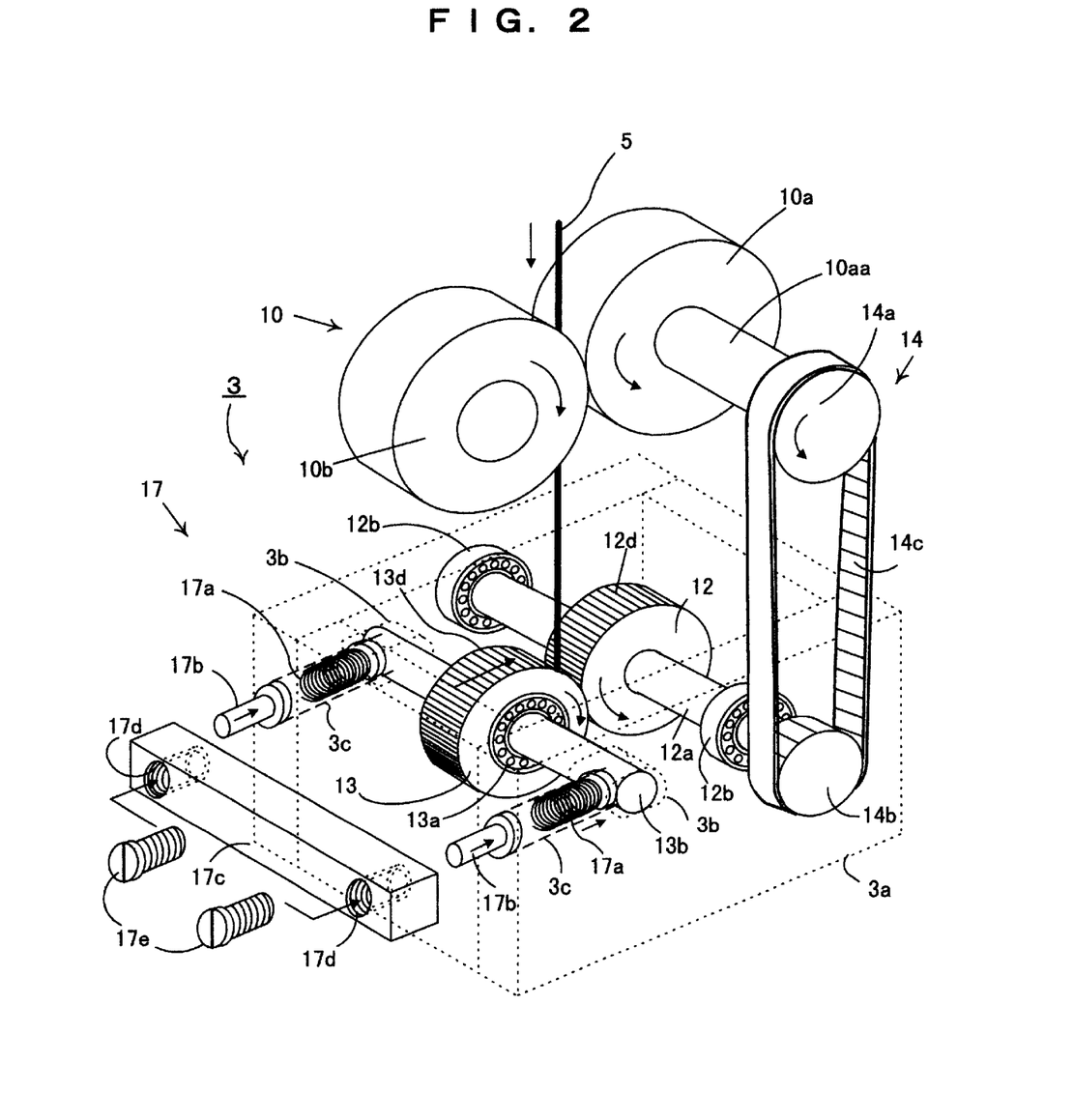
FIG. 2 is a perspective view illustrating an embodiment of the wire cutting device in FIG. 1.

An embodiment of the wire cutting device 3 shown in FIG. 1 will now be explained with reference to FIG. 2.

The wire cutting device 3 has a drive gear 12 and a follower gear 13 with which it engages; the gears 12 and 13 being positioned within a frame element 3a in close proximity to the pair of rollers 10a, 10b. The follower gear 13 has the same shape as the drive gear 12. The wire 5, sandwiched between the drive gear 12 and the follower gear 13, is cut into small pieces 5a as a result of the rotation of the drive gear 12. The rotating axis 12a, to which the drive gear 12 is affixed, is supported at its two ends by a pair of hubs 12b so as to be able to rotate. The hubs 12b are affixed at its outer circumference to the frame element 3a, and on their inner perimeter to the rotating axis 12a. A rotational force transmission mechanism 14 including a timing pulley 14a, is affixed a rotating axle 10aa, to which is further affixed the roller 10a and, a timing pulley 14b to which is affixed to the rotating axis 12a. A timing belt 14c engages the timing pulleys 14a and 14b. In the illustrated embodiment, the drive motor 10c and the rotational force transmission mechanism 14 comprise the drive means for the drive gear 12 and follower gear 13. The follower gear 13 is axially supported through a hub 13a provided on the inside thereof by a support axle 13b so as to be able to rotate. The follower gear 13 engages the drive gear 12, and is freely profile shiftable relative to the drive gear 12. The support axle 13b is supported at its two ends on the frame element 3a by means of a pair of long channels 3b, and is arrayed parallel to the rotating axle 12a. A pair of long channels 3b are formed in the frame element 3a, and extend slightly in a direction perpendicular to the support axle 13b and the rotating axle 12a. In this manner, the support axle 13b may slide freely by a small amount along the channels 3b. The channels 3b are formed such that the distance between the tooth edge of the follower gear 13 and the tooth bottom of the drive gear 12 is approximately zero when the follower gear 13 is closest to the drive gear 12. The follower gear 13 is constantly pressed in the direction of and and against the drive gear 12 by a biasing mechanism 17. The biasing mechanism 17 includes coil springs 17a, which are resilient pieces. The coil springs 17a may be formed on the frame element 3a, and each may be housed within one of a pair of corridors 3c which extend in the direction of movement of the support axle 13b. The two ends of the support axle 13b inside the channels 3, are pressed by the resilient force of the coil springs 17a towards and against the drive gear 12. Each of the corridors 3c open at one end to one of the channels 3b and at the other end to the outside of the side wall of the frame element 3a. A pin 17b, which pushes down on the coil springs 17a, is inserted from the opening formed on the sidewall side of the frame element 3a into the corridors 3c. An affixing piece 17c, which prevents the pins 17b from coming out of the corridors 3c, is affixed to the frame element 3a. A pair of screw holes 17d, which connects to the corridors 3c, are formed on the affixing piece 17c.

The elasticity of the coil springs 17a may be varied by adjusting the degree to which a pair of adjustment screws 17e are turned into the screw holes 17d. In this manner, the meshing of the follower gear 13 with respect to the drive gear 12 may be fine-adjusted. Furthermore, the follower gear 13 is pressed against the drive gear 12 by the coil springs 17a, so that the follower gear 13 is slideable relative to the drive gear 12 in accordance with changes in the diameter of the wire 5. The follower gear 13 and the drive gear 12 can thus sandwich all wires 5 of varying diameters with equal force. The inventors have verified experimentally that a wire with a diameter of 0.2 mm and of hard material can be cut well with a spring force of approximately 2 Kg per coil spring 17a.

Multiple drive gear teeth 12d and follower gear teeth 13d are respectively formed on the perimeter faces of the drive gear 12 and the follower gear 13. Both the gears 12 and 13 are made of a material having a high hardness and high wear-resistance. Such a material may, for example, be high speed steel, super-hard alloy, cermet, zirconia ceramic, or silicon nitride ceramic. Cermet is obtained, for example, by blending TiC powder and Mo—Ni alloy powder and sintering the mixture.

It is preferable that the gears 12 and 13 have the same module (pitch circle diameter/number of teeth).The pressure angle and number of teeth for these should be selected such that no undercut occurs when they are not sandwiching the wire Also, it is desirable that the angle of the tooth-side opening angle be formed so as to be larger than that of the tooth tip angle.

The tooth shape is not limited to a triangular form. The peripheral speed of the gears 12 and 13 is set so that it will be 5 to 10% larger than that of the rollers 10a and 10b. This setting is accomplished by varying the diameter of the drive gear 12 and the follower gear 13 and by varying the gear ratio of the rotational force transmission mechanism 14.

Next, the operation of the wire cutting device 3 will be explained with reference to FIGS. 3, 4, 5, 6, 7, and 8.

Figure 3:
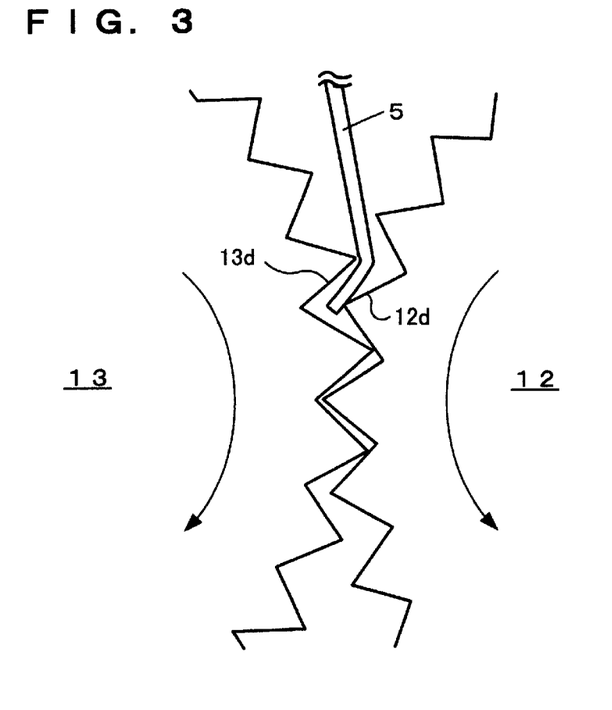
FIG. 3 illustrates an enlargement of a portion of the pair of gears of FIG. 2 between which the wire is fed.
Figure 4:
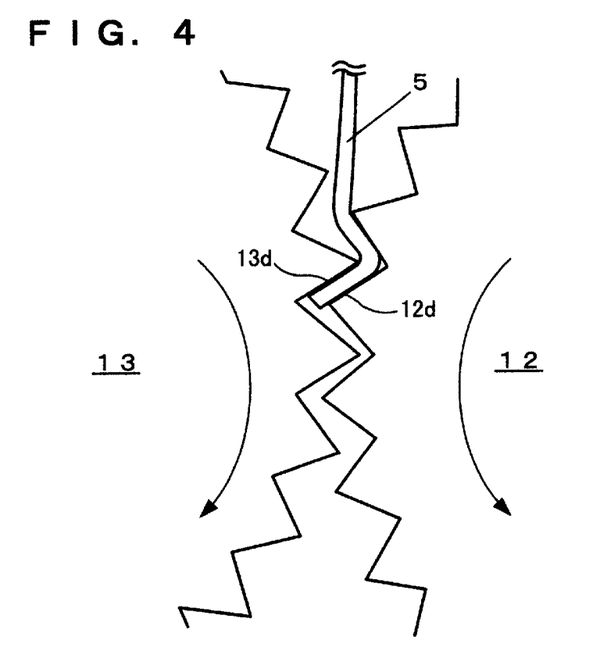
FIG. 4 illustrates an enlargement of a portion of the pair of gears of FIG. 2 between which the wire is fed.
Figure 5:
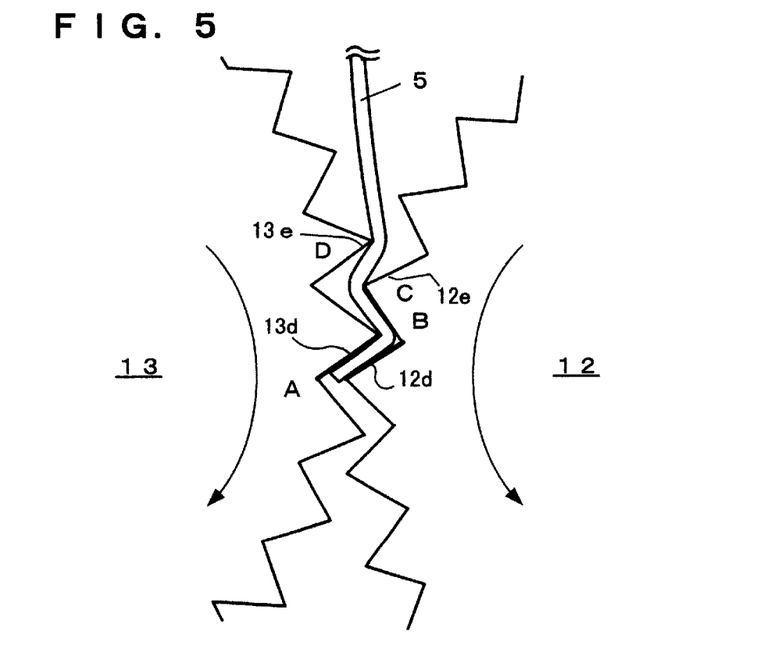
FIG. 5 illustrates an enlargement of a portion of the pair of gears of FIG. 2 between which the wire is fed.
Figure 6:
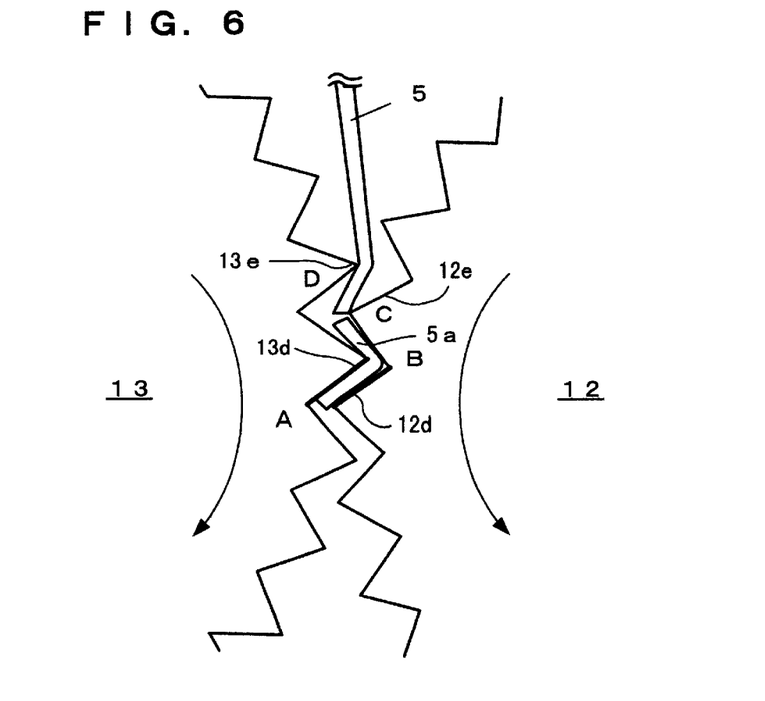
FIG. 6 illustrates an enlargement of a portion of the pair of gears of FIG. 2 between which the wire is fed.
Figure 7:
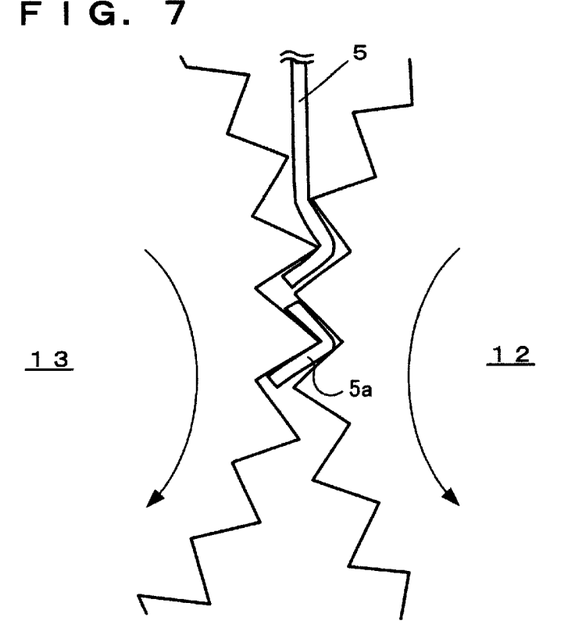
FIG. 7 illustrates an enlargement of a portion of the pair of gears of FIG. 2 between which the wire is fed.
Figure 8:
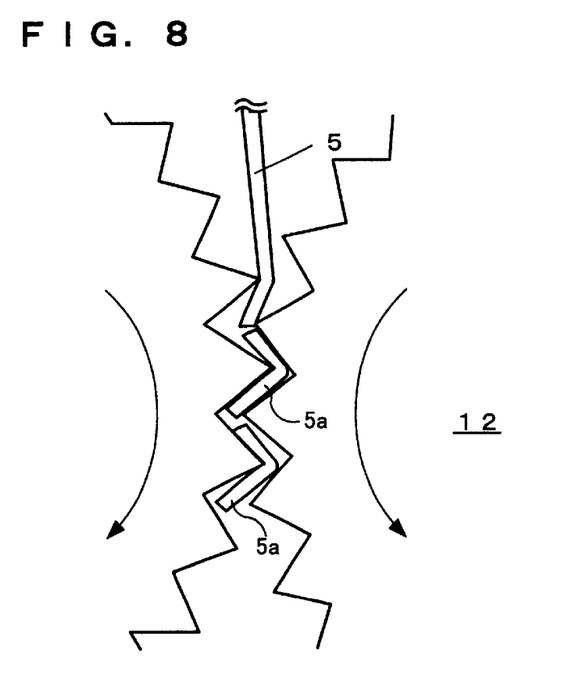
FIG. 8 illustrates an enlargement of a portion of the pair of gears of FIG. 2 between which the wire is fed.

The drive gear teeth 12d of the drive gear 12 and the follower gear teeth 13d of the follower gear 13 reciprocally mesh, and the wire 5 moves turns in the same direction as the gears as it is fed out by the wire take-in device 10. As illustrated in FIG. 3, when the wire 5 is sandwiched in the meshing portion of the drive gear 12 and the follower gear 13, the tip of the wire 5 enters between the gears 12 and 13. Subsequently, as illustrated in FIG. 4, the wire 5 is held in place by being sandwiched between the respective surfaces of the drive gear tooth 12d and the follower gear tooth 13d as the gears 12 and 13 rotate. At this point, the follower gear 13 separates and profile shifts from the drive gear 12 by the diameter of the wire 5 sandwiched between the teeth 12d and 13d. As illustrated in FIG. 5, the wire 5 is restrained between point A and point B in the diagram, while the gears 12 and 13 continue to rotate. The peripheral speed of the take-up rollers 10a, 10b is set to be slower than the peripheral speed of the pair of gears 12, 13, so the stress on the wire 5 between the take-up rollers 10a, 10b and gears 12, 13 gradually increases. The tooth tip (point D in FIGS. 5 and 6) of the follower gear tooth 13e which immediately follows follower gear tooth 13d, by virtue of its friction, stops the wire 5, which is under high tension. In this manner, the wire 5 is restrained under a high tension between the respective ends of the adjacent follower gear teeth 13d and 13e (between points B and D in FIG. 5). Upon further rotation of the gears 12, 13, the wire 5 under tension between the respective tooth ends of the follower gear teeth 13d and 13e is gradually pressed into the follower gear 13 side by means of the drive gear tooth 12e which immediately follows the drive gear tooth 12d. As illustrated in FIG. 6, the wire 5, under increasing tension, finally breaks at the bent portion thereof (point C). In this manner, the cut off small pieces 5a are virtually the same as the valley formed by the drive gear tooth 12d and (in the illustrated embodiment) drive gear tooth 12e, being L-shaped and having a length of approximately 4 mm. As illustrated in FIGS. 7 and 8, the wire 5 is sequentially cut up into the L-shaped small pieces 5a with the additional rotation of the drive gear 12 and the follower gear 13. One small piece 5a is cut from the wire 5 for each rotation by an amount equivalent to one tooth of the drive gear tooth 12d and follower gear tooth 13d, 13. As illustrated in FIG. 1, the small piece 5a falls as is into the collection box 19. An appropriate filter for separation of the small pieces 5a and the machining fluid may also be provided in the collection box 19. The L-shaped small pieces 5a are not prone to stick into one's hand, so the operator may safely dispose of them.

Figure 9:
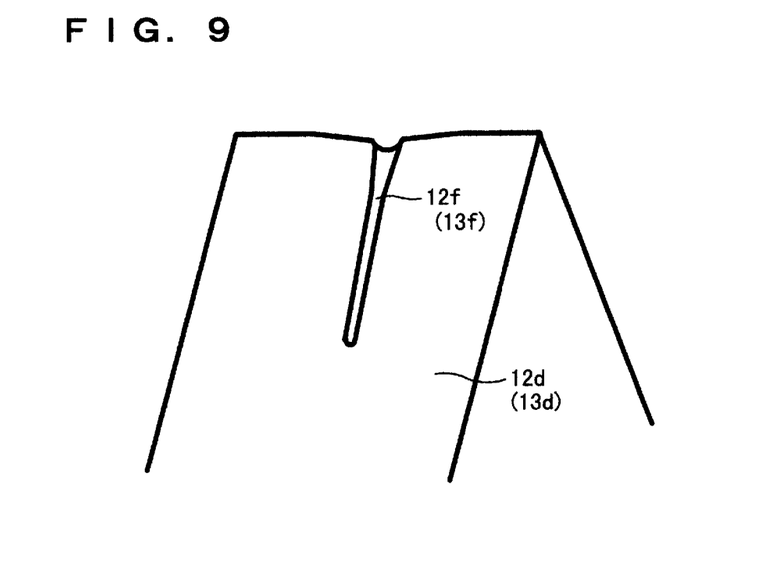
FIG. 9 is a perspective view of an enlargement of a portion of a worn tooth edge on the gear of FIG. 2.

FIG. 9 is a partially expanded perspective diagram showing the state of wear of each of the tooth edges of the drive gear tooth 12d on the drive gear 12 and the follower gear tooth 13d on the follower gear 13.

Figure 10A:
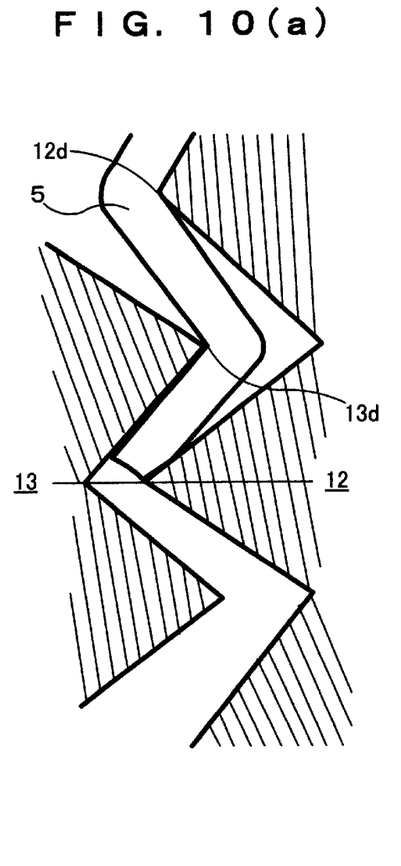
Figure 10B:
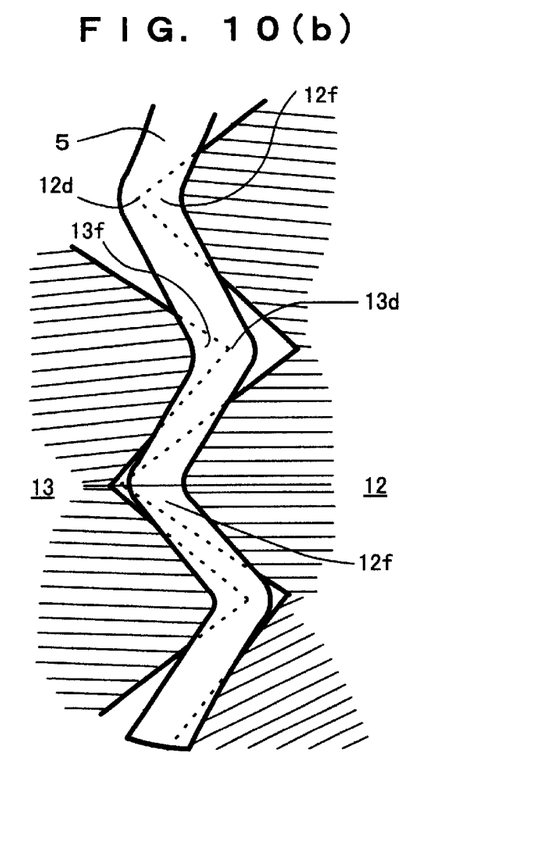
FIG. 10(b) is a side view of an enlargement of a portion of a worn tooth edge of the gear of FIG. 2.

On the drive gear tooth 12d of the drive gear 12 and the follower gear tooth 13d of the follower gear 13, the edge of the teeth may wear over time as the above-described wire cutting is continued. In particular, as shown in FIG. 9, a concave channel 12f (13f) may be formed in the portions of the drive gear tooth 12d which contact the wire 5. FIG. 10(a) illustrates an unworn drive gear tooth 12d and follower gear tooth 13d. As illustrated in FIG. 10(b), the depth of the channel 12f (13f) is about the same as the diameter of the wire 5, and the wire 5 fed between the gears 12 and 13 is virtually buried within the channel 12f (13f).

However, the wire cutting device 3 of the present invention has a configuration which can stably cut the wire 5 so long as the wear of the respective tooth edges of the drive gear tooth 12d and the follower gear tooth 13d do not reach the level illustrated in FIG. 10(b). The wire 5 is held in place by two adjacent teeth of one of the gears, and the portion of the wire 5 so held in place is pressed by the rotation of the other gear towards the first gear. In this manner, by the partial application of a tension greater than the tension resistance to the wire 5, a method is presented for breaking the wire 5 by exceeding its tensile strength. The stretch rate of commonly sold hard wire electrodes is less than approximately 3%. The wire cutting device 3 of the present invention comprises a pair of gears 12, 13 which hold the wire 5 in place and pull it by means of rotational movement, while using a pressing force imparting mechanism 17, which always pushes the follower gear 13 toward the drive gear 12. Therefore even when the tooth edges of those gears are worn, the follower gear tooth 13d (FIGS. 3–6) can place the wire 5 under tension by its non-edge portion so long as the drive gear 12 and the follower gear 13 are able to pinch the wire 5. Also, even if the wire 5 is consumed after use in generating an electrical discharge, such that its diameter changes, or the direction of consumption of the wire 5 changes, or there is a change in the material of the wire 5, the follower gear 13 and the drive gear 12 can still hold such differing wires 5 using a similar force.

Figure 11:
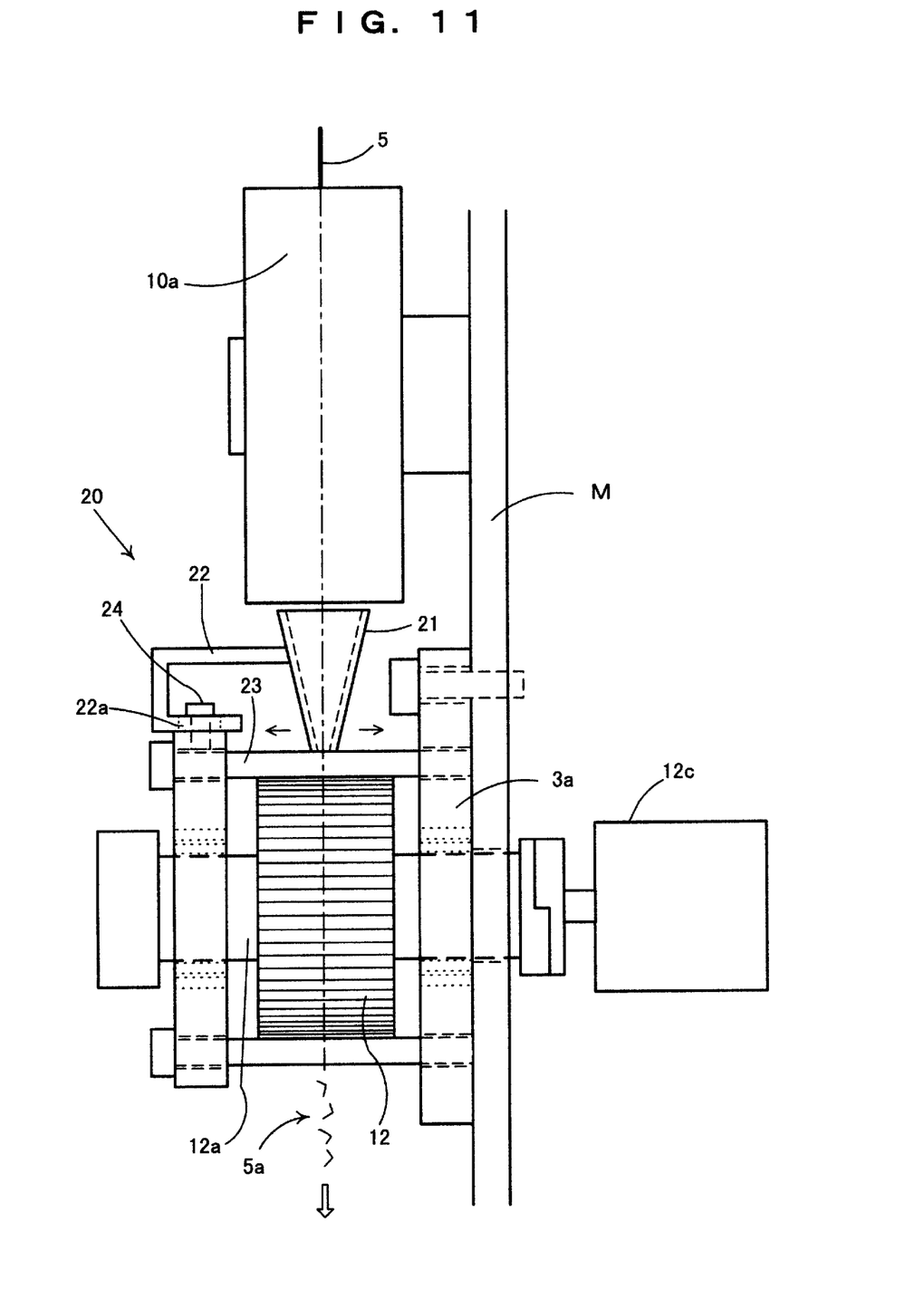
FIG. 11 is a side view illustrating another embodiment of the wire cutting device of FIG. 1.

Another embodiment of the wire cutting device 3 of FIG. 1 will now be explained with reference to FIG. 11.

In the illustrated embodiment, a wire position adjustment device 20, which moves the wire 5 parallel to the rotational axis of the gears 12, 13 in such a way that the wear induced channels 12f (13f) will not be formed in the same place, is provided between the wire pull-in device 10 and the gears 12, 13. The wire position adjustment device 20 includes a funnel-shaped position adjustment part 21 which guides the travel of the wire 5 and is provided between the rollers 10a, 10b and the gears 12, 13.

The diameter of the funnel-shaped position adjustment part 21 reduces as it directs wire from the roller 10a, 10b toward the gears 12, 13.

The wire position adjustment device 20 includes a support stand 23 affixed to the frame element 3a mounted on the side wall M of the wire cut electric discharge machine 1. The position adjustment part 21 is provided so as to be able to move freely on the support stand 23 through a movement plate 22. A long channel 22a, which extends in the direction of the rotational axis of the gears 12, 13, is formed in the movement plate 22. The movement plate 22 is affixed to the support stand 23 by means of an adjustment screw 24, which is inserted into the long channel 22a. By loosening the adjustment screw 24 and moving the movement plate 22 in the direction of the rotational axis of the gears 12, 13, it is possible to move the position of the wire 5 fed out from the lower opening in the position adjustment part 21 in the direction indicated in the diagram by an arrow. In this manner, it is possible to change the contact position of the wire 5 and the gears 12, 13 with respect to the direction of the rotational axis of the gears 12 and 13.

In the illustrated embodiment, the position adjustment piece 21 moves relative to the gears 12, 13, but the position adjustment piece 21 may also be fixed, and the gears 12, 13 may move in the direction of the rotational axis thereof. Also, as illustrated in FIG. 11, the drive motor 12c may directly drive the rotational axle 12a on the drive gear 12. In this case, the rotational force of drive motor 12c may be transmitted to the roller 10a by means of the rotational force transmission mechanism of FIG. 2, or drive gear 12 and roller 10a may be driven by respectively separate motors.

In one example, the volume density of the small pieces 5a of the wire 5 recovered in the collection box 19 using the wire cutting device 3 was 2.8 g/cm$^3$. This is approximately 5 times that obtained when collected in a collection box without cutting. The life of the drive gear 12 and the follower gear 13 in the wire cutting device 3 depends on the number of teeth, but is extremely long. For example, by changing the contact position of the wire 5 and the gears 12, 13, the life of a gear with a diameter of approximately 50 mm, thickness of 20 mm and tooth count of 50 is projected to be 2 to 3 years. It has also been confirmed that the cutting noise of the wire cutting device 3 is extremely low.

It is not intended that the present invention be restricted to the forms disclosed. It is clear with reference to the description above that numerous improvements and variations are possible.

The illustrated embodiment was selected in order to explain the essence of the invention and its practical application. The scope of the invention is defined only by the appended Claims.

What is claimed is:

1. A wire cutting device for use in a wire cut electric discharge machine for cutting spent wire electrode used to generate an electric discharge, said device comprising:

a drive gear having an axis of rotation and peripheral teeth extending in the direction of the axis of rotation;

a follower gear meshed with the drive gear whereby a rotational force is transmitted to the follower gear by the drive gear, said follower gear having an axis of rotation and a peripheral teeth extending in the direction of the axis of rotation; the axis of rotation being shiftable relative to the axis of rotation of the drive gear;

a bias means for pressing the follower gear against the drive gear;

a wire take-up positioned to take-up spent wire electrode and feed the spent wire electrode between the drive gear and the follower gear; and a drive means for driving the gear such that the peripheral speed of the drive gear is higher than the speed at which the spent wire electrode is fed from the wire take-up.

2. The wire cutting device according to claim 1 wherein the wire electrode is pinched between the peripheral teeth of the drive gear and the follower gear and held between two adjacent peripheral teeth of the drive gear and the follower gear, whereby the portion of the wire electrode held in place is broken by tensile force while pressed between opposing teeth of the drive gear and follower gear.

3. The wire cutting device according to claim 1, further comprising a means for changing the position at which the wire electrode contacts the drive gear and the follower gear, in the direction of the rotational axis of the drive gear and the follower gear.

4. The wire cutting device according to claim 1, further comprising means for adjusting the force applied by the bias means against the follower gear.

5. The wire cutting device according to claim 4 wherein said follower gear is mounted on an axle; said axle being shiftably supported at its ends.

6. The cutting device according to claim 5 wherein said bias mechanism comprises a pair of resilient members arranged to bias the ends of follower gear axle whereby the follower gear is resiliently biased towards said drive gear.

7. The wire cutting device according to claim 6 wherein said resilient members comprise coil springs.

8. The wire cutting device according to claim 6 further comprising a bias adjustment mechanism for varying the force exerted by said resilient members against said follower gear axle.

9. The wire cutting device according to claim 1 wherein said drive gear is mounted on an axle and said drive means is mounted on an axle, and further comprising a pair of timing pulleys and a timing belt, one of said timing pulleys being affixed to the drive gear axle and another of said timing pulleys being fixed to drive means axle.

* * * * *